Sept. 2, 1947.   P. N. EVANS   2,426,967
FRICTION BRAKING DEVICE FOR HOISTING APPARATUS
Filed April 4, 1945    3 Sheets-Sheet 3

Inventor
Percy Harmon Evans
By
Attorneys

Patented Sept. 2, 1947

2,426,967

UNITED STATES PATENT OFFICE 2,426,967

FRICTION BRAKING DEVICE FOR HOISTING APPARATUS

Percy Norman Evans, Brentford, England, assignor to A. C. E. Machinery Limited, Brentford, England, a company of Great Britain Application April 4, 1945, Serial No. 586,562
In Great Britain April 17, 1944

3 Claims. (Cl. 254—173)

This invention relates to hoisting machinery and apparatus such as lifts, cranes, winches and the like and has for its object to provide an improved form of friction braking device applicable to such machinery and apparatus and designed to afford safety braking means adapted to operate automatically to stop acceleration or further movement when the speed of operation exceeds a predetermined limit.

The invention has a particular application to manually controlled winches wherein over speeding and consequent damage due to the weight of a load, in the event of temporary failure of the manual control, are avoided.

According to the invention braking means for hoisting machinery and apparatus comprise rotary elements constantly actuated by rotation of a winding drum or other rotary part of the machinery or apparatus and adapted under a predetermined excessive speed to move to a position wherein friction clutch devices are caused to operate to retard or stop rotation of the winding drum by bringing it into engagement with external braking means.

According to one form of the invention braking means for hoisting machinery and apparatus comprise a winding drum mounted freely upon a shaft carried eccentrically in its bearings, means disposed within said winding drum and adapted under a predetermined excessive speed to cause engagement of clutch devices whereby torque is transmitted from the drum to the shaft which partially rotates in its eccentric bearings to bring the said winding drum into operative engagement with external braking means.

Figure 1:
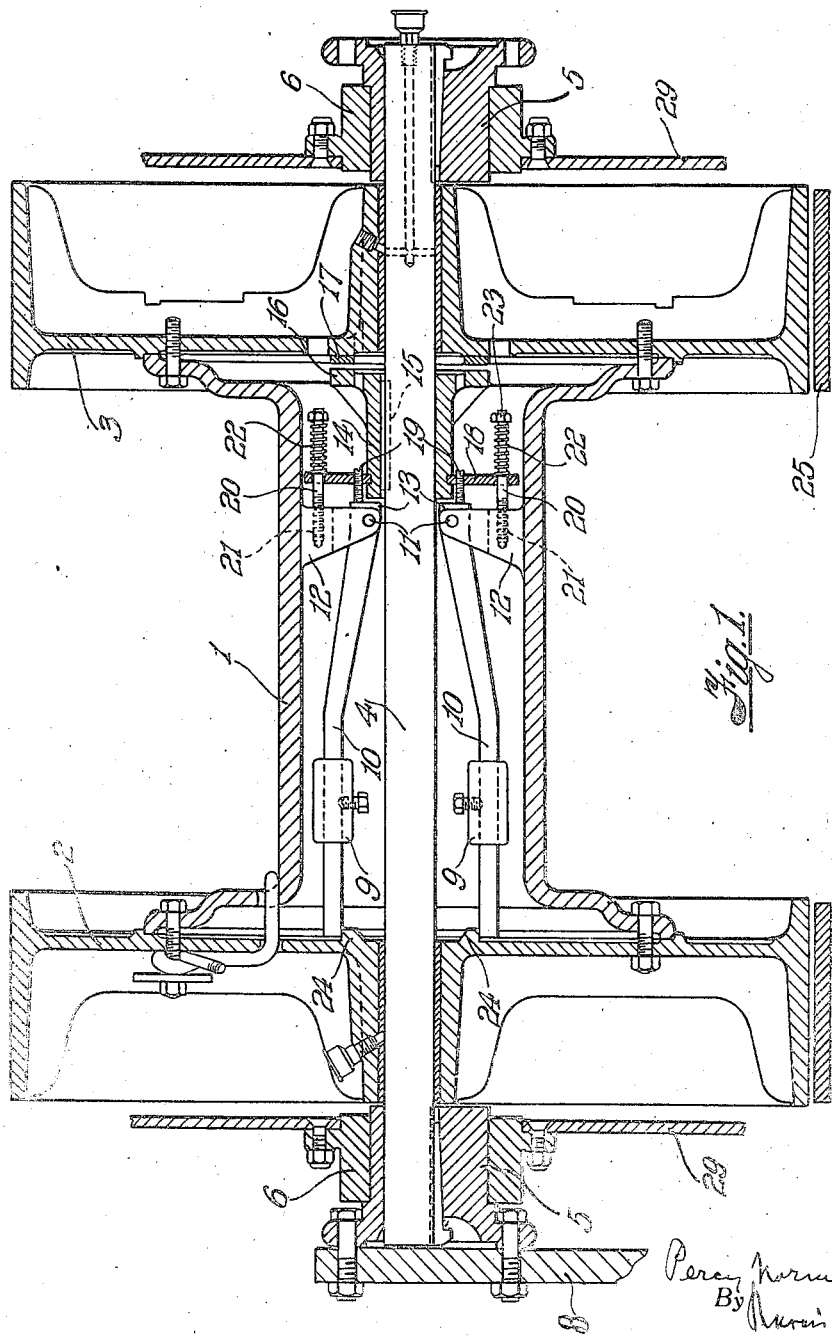
Figure 2:
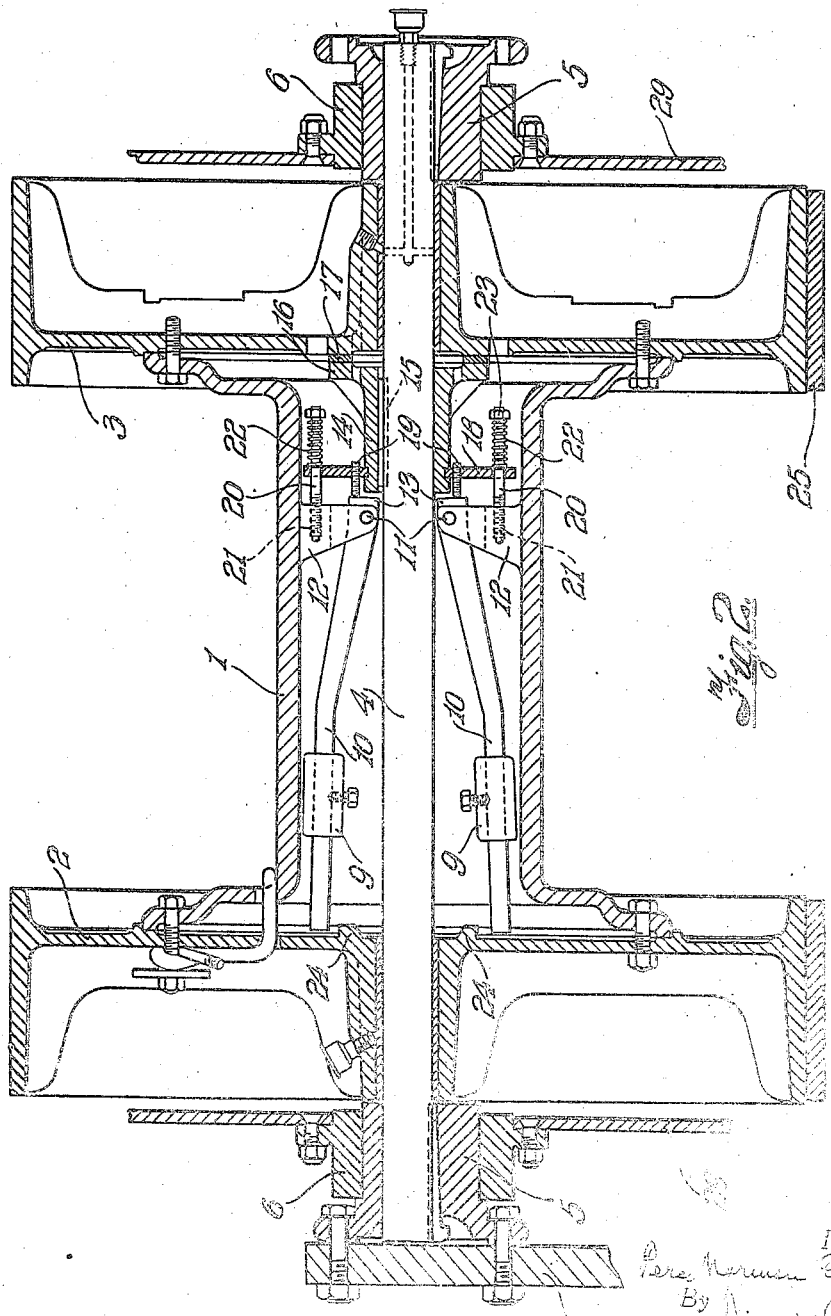
Figure 3:
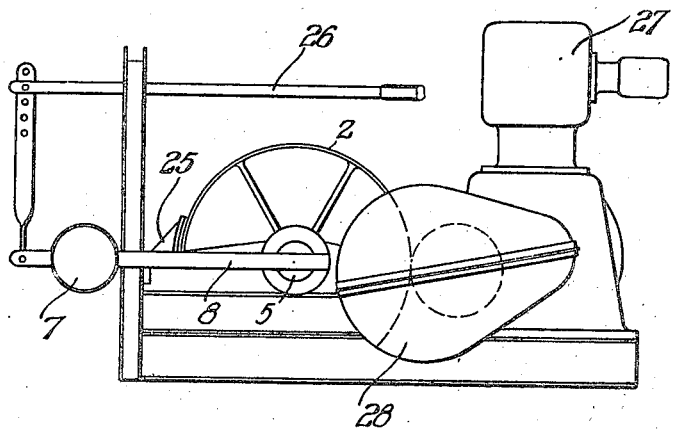
Figure 4:
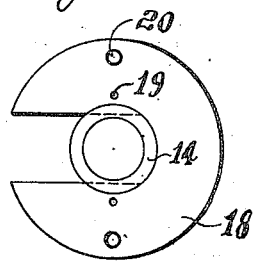

Reference will now be made to the accompanying drawings which illustrate a winding drum having a safety braking device according to the invention and in which:

Fig. 1 is a sectional elevation of the winding drum, showing the inoperative position of the control device, Fig. 2 is a sectional view similar to Figure 1 but showing the control device operative, Fig. 3 is an external elevation of a winch showing a gravity braking device suitable for use in conjunction with the arrangement shown in Figures 1 and 2, and Fig. 4 is a detail view of the mounting of the controlling clutch actuating member.

In the construction illustrated which shows the application of friction braking means to a hand-controlled winch, the winding drum 1 is connected at its ends to pulleys 2 and 3, the assembly being rotatable relatively to a shaft 4 which is normally fixed but is mounted in eccentric sheaves 5 which are rotatable partially, as hereinafter described, in bearings 6 carried in fixed frame members 29. The use of such eccentric sheaves is already known in conjunction with a brake band or brake shoes applicable to one or both of the pulleys 2 and 3, a winch embodying such an arrangement being shown in Figure 3 wherein a counterbalance weight 7 mounted on an arm 8 is employed to hold the sheaves 5 in positions wherein the pulley or pulleys are in contact with braking elements 25, the winch being released for operation by a hand operated lever 26.

In this form of construction the winch is driven from a prime mover 27 through a gear box 28 and friction pinions engaging the rims of the pulleys 2 and 3.

The arrangement according to the present invention comprises weights 9, conveniently two in number, disposed within the drum 1 and carried near the ends of arms 10 pivotally connected at 11 to brackets 12 extending inwardly from the walls of the drum. Each arm 10 is formed integral with a smaller arm 13 extending in a direction opposite to the arm 10. Mounted on the shaft 4 is a sleeve 14 free to slide along the shaft but restrained from rotation relatively to the shaft by a feather key 15. This sleeve 14 is formed at one end with a friction disc 16 constituting one member of a friction clutch, the other member of which is constituted by an annular ring 17 of friction material carried by the pulley 3. Mounted on the sleeve 14 is an actuating plate 18 carrying pins 19 whose inner ends bear against the ends of the shorter arms 13. The actuating plate 18 is formed with an opening at one side and is inserted into a peripheral groove formed in the sleeve 14. The actuating plate 18 is normally held against movement by studs 20 which have screw-threaded engagement, indicated at 21, with the brackets 12 and these studs pass freely through the actuating plate 18 on the side of which remote from the brackets they carry compression springs 22 each mounted between a nut 23 on the end of the stud and the actuating plate. The ends of the levers 10 remote from the pivots 11 are capable of certain movement, this movement towards shaft 4 being limited by stops 24 formed in the pulley 2.

In the operation of the arrangement above described rotation of the winding drum 1 causes the weights 9 to swing outwards in the manner of a governor under centrifugal action until, when the speed of rotation exceeds a predetermined maximum, the arms 10 reach a position wherein the arms 13 press upon the pins 19 to move the sleeve 14 along the shaft 4 towards the right (Figures 1 and 2) so that the clutch member 16 comes into engagement with the clutch member 17. This action transmits torque from the drum 1 to the shaft 4 so that the rotary motion of the drum is transferred to the shaft which being fixed to the eccentric sheaves 5 partially rotates and in doing so changes its axial position sufficiently to bring the pulleys 2 and 3 into engagement with the brake bands or shoes 25 (Fig. 3) and thereby cause the operation of the winch to be reduced in speed or stopped altogether. As only a partial rotation of the shaft 4 is necessary to bring the braking means into operation excessive speed tends to bring the main brakes into operation for a sufficient period of time to reduce speed to such a degree that the torque from the drum and pulleys transmitted through the clutch members 16 and 17 to the shaft 4 by the action of the weights 9 is lost. The springs 22 operate to restore the clutch disc 16 to its normal position shown in Figure 1 after operation. As the application of a certain effort is necessary to move the brake drum 1 with its pulleys 2 and 3 into and out of engagement with the brake shoes 25 (or brake bands) the operation of the safety clutch mechanism as described above will result in the winch remaining braked until intentionally restarted.

The invention is not restricted to the means described for operating the friction clutch device as any suitable means, such, for example, as push rods may be employed for transmitting movement from the weight carrying arms to the clutch members, it being necessary only to ensure that the movable friction disc always moves with its operative face parallel to the surface of the fixed clutch member.

I claim:

1. Braking means for hoisting machinery, comprising in combination, a winding drum, a friction pulley mounted on each end of said drum, external braking means adapted to act on at least one of said pulleys, a shaft upon which said drum and said pulleys are rotatable freely, eccentric bearings for said shaft, a clutch member carried by one of said pulleys, a second movable clutch member non-rotatable on said shaft but slidable thereon to engage said clutch member carried by one of said pulleys, spring actuated means for restoring said movable clutch member to inoperative position, and weights pivotally mounted within said drum and operable under centrifugal action at a predetermined excessive speed of the drum to engage said clutch members and impart torque from the drum and pulleys to said shaft and thereby rotate said shaft on its eccentric bearings to bring said friction pulleys into engagement with said external braking means.

2. Braking means for hoisting machinery, comprising in combination, a winding drum, a friction pulley mounted at each end of said drum, external braking means adapted to act on at least one of said pulleys, a shaft upon which said drum and pulleys are rotatable freely, eccentric bearings for said shaft, a clutch member carried by one of said pulleys, a second movable clutch member non-rotatable on said shaft but slidable thereon to engage said clutch member carried by one of said pulleys, spring actuated means for restoring said movable clutch member to inoperative position, arms pivotally mounted on the inner wall of the drum, and weights carried on said arms, the ends of said arms remote from the weights being adapted to bring the slidable clutch member into engagement with said clutch member carried by one of said pulleys to thereby transmit torque from the drum and pulleys to said shaft and rotate said shaft on its eccentric bearings to bring said friction pulleys into engagement with said external braking means.

3. Braking means for hoisting machinery, comprising in combination, a winding drum, a friction pulley mounted at each end of said drum, external braking means adapted to act on at least one of said pulleys, a shaft upon which said drum and pulleys are rotatable freely, eccentric bearings for said shaft, a clutch member carried by one of said pulleys, a sleeve slidably but non-rotatably mounted on said shaft, a second clutch member carried by said sleeve, a plate on said sleeve and pins mounted on said plate, arms pivotally mounted on the inner walls of said drum, weights carried by said arms, the ends of said arms remote from said weights being engageable under centrifugal action with said pins to move the sleeve along said shaft to bring the clutch members into operative contact and thereby transmit torque from said drum and pulleys to said shaft and rotate said shaft on its eccentric bearings to bring said pulleys into engagement with said external braking means, and spring actuated means for returning said plate, sleeve and second clutch member to normal position after operation.

PERCY NORMAN EVANS.

REFERENCES CITED

The following references are of record in the file of this patent:

UNITED STATES PATENTS

| Number | Name | Date |
|---|---|---|
| 1,677,108 | Johnson | July 10, 1928 |
| 1,482,469 | Jespersen | Feb. 5, 1924 |